United States Patent [19]
Thompson et al.

[11] Patent Number: 5,430,842
[45] Date of Patent: Jul. 4, 1995

[54] INSERTION OF NETWORK DATA CHECKSUMS BY A NETWORK ADAPTER

[75] Inventors: Michael I. Thompson, Rocklin; Paul T. Congdon, Sacramento; John L. Burnett, Cupertino; Frank Fiduccia, deceased, late of Cupertino, Calif., by Julie W. Wu, Rachel E. Fiduccia, heirs

[73] Assignee: Hewlett-Packard Company, Palo Alto, Calif.

[21] Appl. No.: 891,505

[22] Filed: May 29, 1992

[51] Int. Cl.$^6$ .................. G06F 13/12; G06F 13/14
[52] U.S. Cl. ................................ 395/200; 395/575; 371/37.6; 371/37.7; 364/260.2; 364/266.5; 364/266.6; 364/265.1
[58] Field of Search .............. 395/200; 371/37.7, 37.6; 370/85.6

[56] References Cited

U.S. PATENT DOCUMENTS 4,168,469  9/1979  Parikh et al. .................. 325/38 R
5,058,110 10/1981  Beech et al. .................. 371/37.7

OTHER PUBLICATIONS

CMC-1050 Series FDDI/FXP 9u Intelligent Controller (Revision Level B) Reference Guide, p. 318.

*Primary Examiner*—Thomas C. Lee
*Assistant Examiner*—Le Hieh Luu

[57] ABSTRACT

A system implements checksumming of a network packet to be sent over a network. A processor constructs the network packet within a main memory. The network packet is transferred from the main memory to a packet storage memory within a network adapter. During the transfer, the network adapter calculates a checksum for the network packet. The network adapter then inserts the checksum into the network packet within the packet storage memory. The network adapter then sends the network packet to the network. In order to calculate the checksum for the network packet, hardware within the network adapter "snoops" an internal bus within the network adapter as the network packet is transported to the packet storage memory. Also, a checksum header is prepended to the network packet which includes control information for checksumming. This control information includes, for example, an indication whether the network adapter is to calculate a checksum and a specification of what data in the network packet is to be checksummed. The control information may additionally include a location within network packet where the checksum is to be inserted.

9 Claims, 23 Drawing Sheets

INSERTION OF NETWORK DATA CHECKSUMS BY A NETWORK ADAPTER

BACKGROUND

The present invention concerns a hardware system which performs insertion of network data checksums.

Most complex networks operate using several levels of protocol, each operating on a different layer of the network. For example, complex networks operating according to ISO OSI standard architecture include a physical layer, a link layer, a network layer and a transport layer. See, Proceedings of the IEEE, Volume 71, No. 12, December 1983.

The layers of protocol generally require various header fields to be included with data sent across a network. These header fields are variously used for such function as providing destination and source addresses, assuring efficient data flow, and detecting and correcting errors in data transmission. Typically, significant processor time is spent in generating the header fields, deciphering the information in the header fields and copying data.

SUMMARY OF THE INVENTION

In accordance with the preferred embodiment of the present invention, a method is provided for implementing checksumming of a network packet to be sent over a network. A processor constructs the network packet within a main memory. The network packet is transferred from the main memory to a packet storage memory within a network adapter. During the transfer, the network adapter calculates a checksum for the network packet. The network adapter then inserts the checksum into the network packet within the packet storage memory. The network adapter then sends the network packet to the network.

In order to calculate the checksum for the network packet, hardware within the network adapter "snoops" an internal bus within the network adapter as the network packet is transported to the packet storage memory. Additionally, in the preferred embodiment, a checksum header is prepended to the network packet which includes control information for checksumming. This control information includes, for example, an indication whether the network adapter is to calculate a checksum and a specification of what data in the network packet is to be checksummed. The control information may additionally include a location within network packet where the checksum is to be inserted.

For a network packet received from the network, the network adapter receives the network packet from the network, for example, into a packet storage memory. A transfer of the network packet is performed from the network adapter to the main memory. During this transfer, the network adapter calculates a checksum for the network packet. The network adapter appends the checksum onto the network packet transferred to the main memory.

In order to calculate the checksum, hardware within the network adapter, snoops an internal bus within the network adapter as the network packet is transferred to the main memory. For an inbound network packet, checksum configuration information may be prepended to the beginning of a network packet. Alternately, checksum configuration information may be provided by the processor. The checksum configuration information includes, for example, an indication whether the network adapter is to calculate a checksum, and a specification of what data in the network packet is to be checksummed.

The present invention allows the performance of checksumming without utilizing host processor time and without the degradation of performance of DMA transfers within the network adapter.

DESCRIPTION OF THE PREFERRED EMBODIMENT

Figure 1:
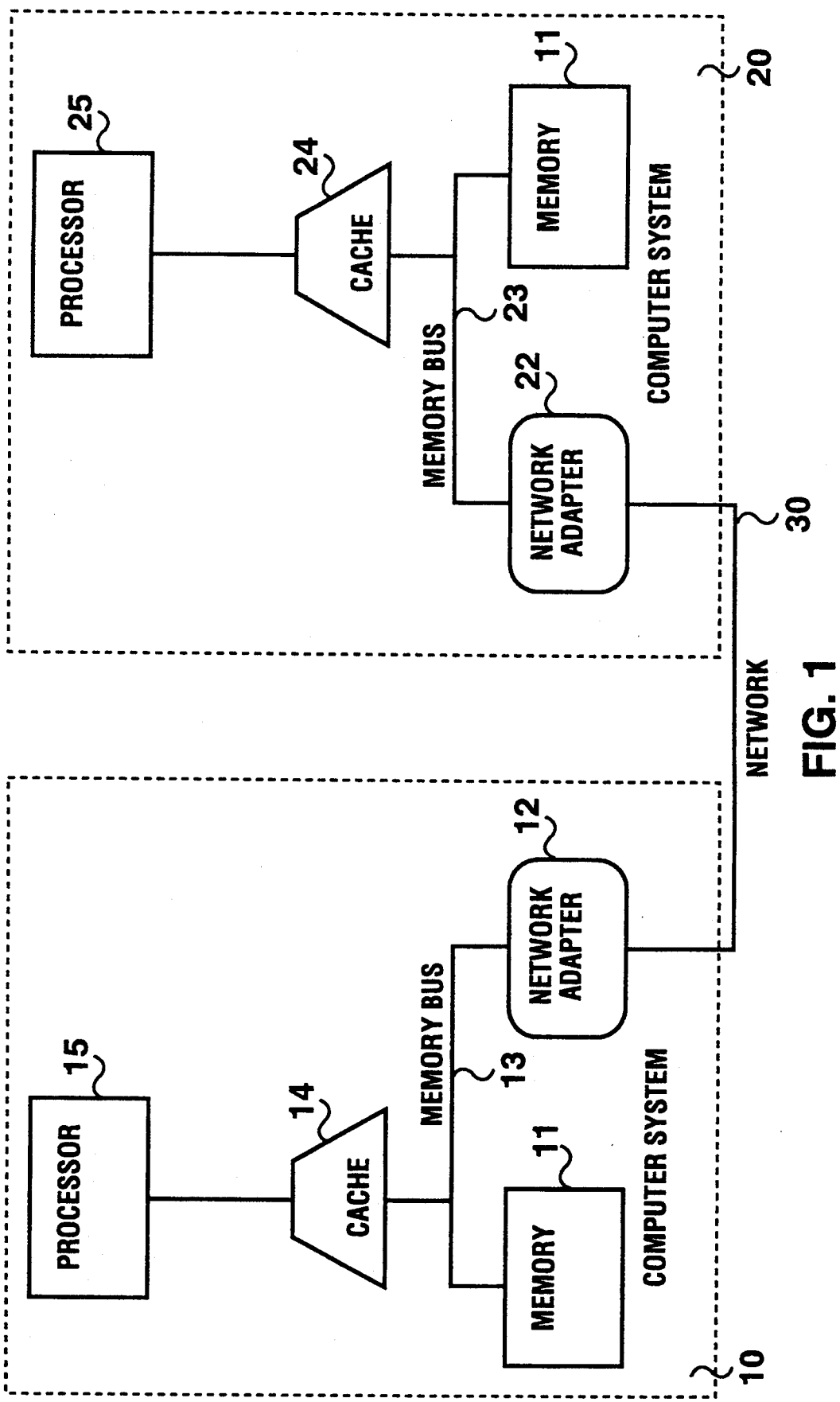
FIG. 1 shows a block diagram which shows two computer systems connected to a network.

FIG. 1 is a simplified block diagram which shows a computer system 10 connected to a computer system 20 over a network 30. Computer system 10 includes a processor 15, a cache 14, a memory 11 and a network adapter 12. A memory bus 13 connects processor 15 (through cache 14), memory 11 and network adapter 12. Network adapter 12 serves as an interface to network 30. Computer system 20 includes a processor 25, a cache 24, a memory 21 and a network adapter 22. A memory bus 23 connects processor 25 (through cache 24), memory 21 and network adapter 22. Network adapter 22 serves as an interface to network 30. The present invention concerns performance of the network data to simplify the assembly and deciphering of header fields for data which is sent across network 30.

Figure 2:
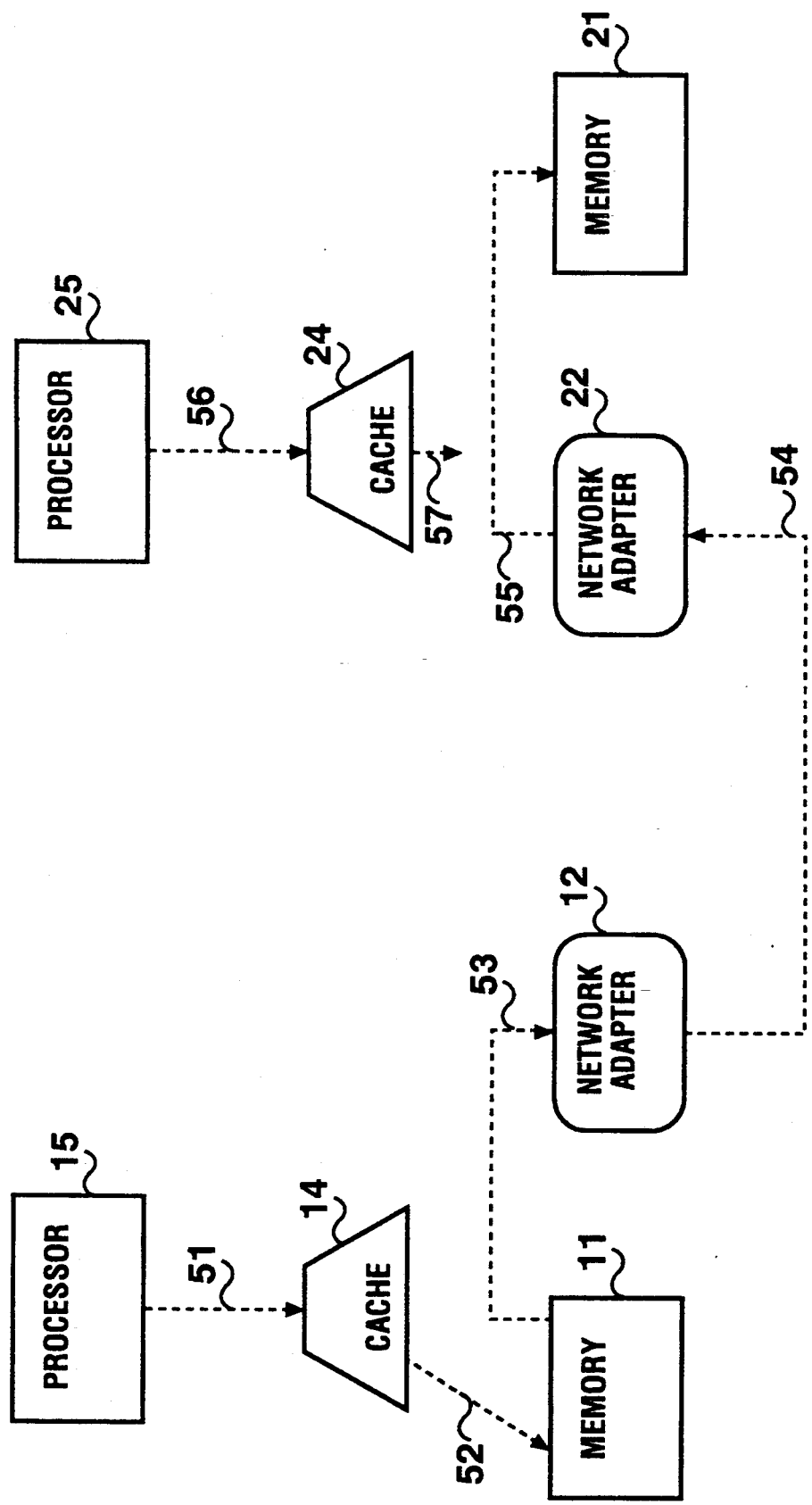
FIG. 2 shows data flow through a network in accordance with a preferred embodiment of the present invention.

FIG. 2 shows data flow of a message which is transferred across network 30 (shown in FIG. 1). A data path 51 and a data path 52 represent the flushing (or writing through) from cache 14 to memory 11 any information in cache 14 which will be used as part of the header or data forming the message. A data path 53 represents a DMA transfer operation from memory 11 to network adapter 12. A data path 54 represents data flow across network 30 (shown in FIG. 1). A data path 55 represents a DMA transaction from network adapter 22 to memory 21. A data path 56 and a data path 57 represents an invalidation of memory locations within cache 24 which contain data made stale by the DMA transaction from network adapter 22 to memory 21.

In order to achieve the simplified data path for messages, network adapter 12 and network adapter 22 perform three operations normally performed by processor 15 and processor 25, respectively. The following discussion sets out how these operations are performed by network adapter 12; however, since network adapter 12 and network adapter 22 are identical in performance, the discussion equally applies to the operation of network adapter 22.

The first operation is the generation and insertion of network data checksums by network adapter 12. The implementation of the checksum calculation by network adapter allows the generation and insertion of the checksum with virtually no added overhead or time incurred by processor 15.

In the outbound direction, processor 15 provides network adapter 12 checksum control information which indicates the proper method of checksumming and the location to insert the result. This control information is prepended to the packet in the DMA data stream traveling along data path 53. As the data is transferred from memory 11, network adapter 12 calculates the checksum. When the transfer is complete, network adapter 12 inserts the checksum into the proper location within the packet before transmitting the packet on network 30 (shown in FIG. 1).

In the inbound direction, network adapter 12 decodes the packet header and programs the checksum control information directly into internal registers. The network adapter 12 calculates the checksum as it transfers the packet to memory 11. When the network adapter 12 completes the calculation of the checksum, network adapter 12 appends the result to the data stream that is being transferred to the memory 11. The processor 15 compares this checksum result against the packet checksum to verify the data.

The second operation which the network adapters performs is the automatic separation of headers and data during the transfer of incoming packets from network adapter 12 to memory 11. Splitting the header and data during the transfer allows the data to be placed on a page aligned boundary in host memory. Memory pages can be delivered to the proper application by virtual page remapping. This process is accomplished by simple virtual pointer manipulation and eliminates the need to copy the data once the packet has been transferred to memory 11 by network adapter 12.

Network adapter 12 determines the location of the header/data split and programs the DMA hardware with this value. The DMA hardware counts down the bytes of the header until the split location is reached. By adding pad data, the DMA hardware assures that the beginning of the data portion of the packet will fall on a memory page boundary. This process is run in parallel with the checksum process described above.

The third operation which network adapter 12 performs is the alignment of network headers. This is accomplished by the insertion of pad bytes based on specific values found in the network link header. Many processors are unable to access multi-byte fields which are not aligned to the corresponding multi-byte boundary. A processor would have to copy the bytes to an auxiliary buffer to access the data. Network adapter 12 eliminates the need for this copy.

Network adapter 12 searches the incoming byte stream for specific values in the destination SAP (DSAP) field of the network link header. The hardware will insert between 0 and 3 pad bytes between the destination SAP and source SAP fields based on the value found in the destination SAP field. Subsequent headers will then be 4-byte aligned in the data stream.

Figure 3:
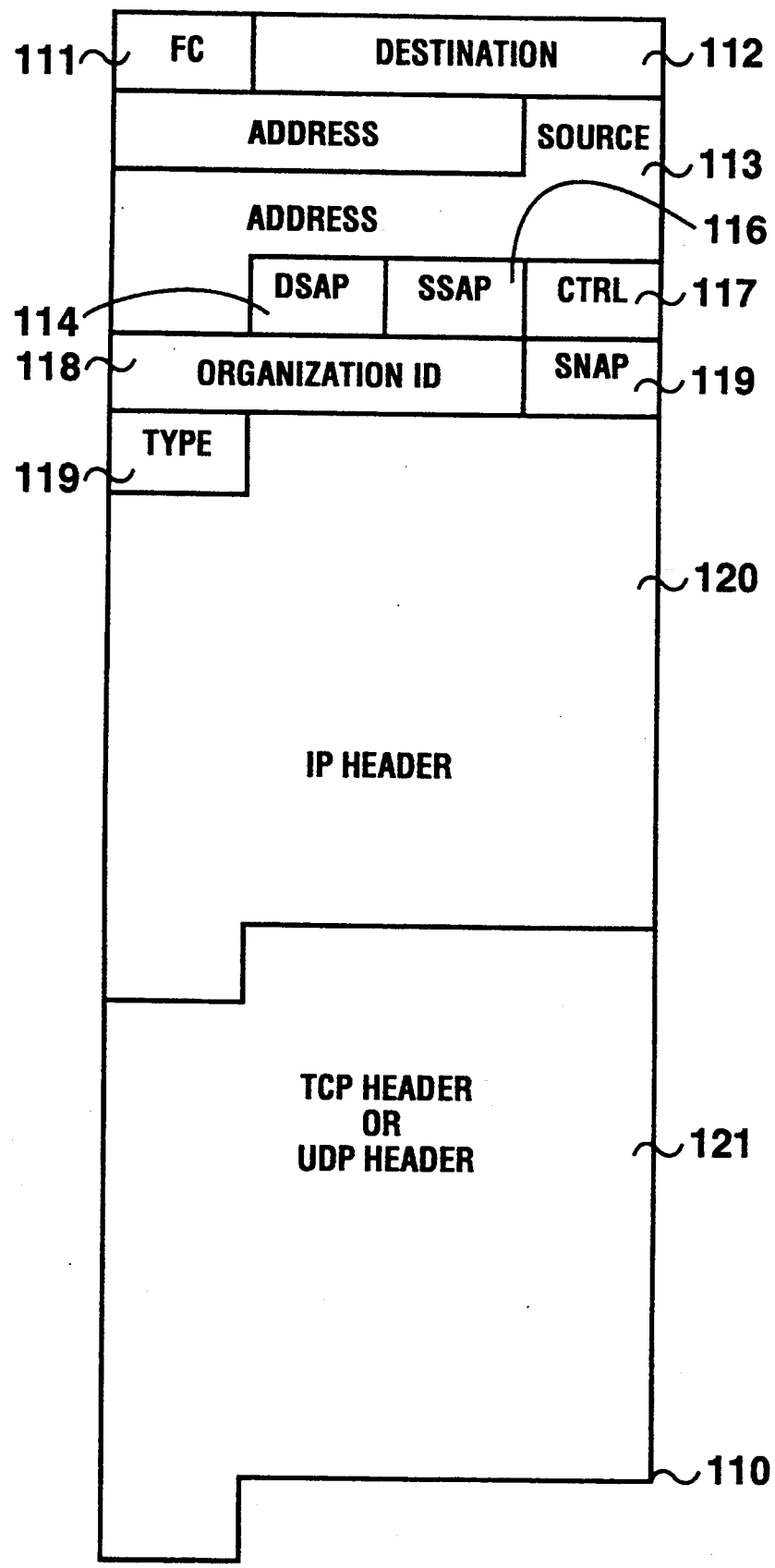
FIG. 3, FIG. 4, FIG. 5 and FIG. 6 show sample headers for messages sent in accordance with a preferred embodiment of the present invention.

FIGS. 3 through 6 show sample headers for messages sent in accordance with a preferred embodiment of the present invention. FIG. 3 shows an FDDI snap header 110 before the insertion of DSAP pad bytes. Media header 110 includes a one byte frame control (FC) field 111. A six-byte destination address field 112 gives the media address of a station receiving the packet. A six-byte source address field 113 gives the media address of a station sending the packet.

A one byte Destination Service Access Point (DSAP) field 114 defines the type of service being used and therefore the format of the media header. If DSAP equals $AA_{hex}$ then media header 110 is a SNAP header and three bytes of pad will be inserted after DSAP field 114. If DSAP equals $FC_{hex}$, media header 110 is an HP expansion SAP and one pad byte will be inserted after DSAP field 114. In the present invention all other DSAP values result in the insertion of no pad bytes. This is because other headers, for example, an FDDI 802.2 header, do not require additional pads to be inserted.

A one byte SSAP field 116 contains the source service access point. LLC 802.2 Type 1 Control (CTRL) field 117, in the preferred embodiment, is always set to 3 which indicates unnumbered information. A three byte organization ID field 118 is not processed by the preferred embodiment of the present invention. A two byte SNAP type field 119 is not processed by the preferred embodiment of the present invention.

After the above-described fields of the link header, an IP header 120 is followed by a TCP header or a UDP header. IP header 120 is twenty or more bytes in length. A TCP header is twenty or more bytes in length. A UDP header is eight bytes in length.

Figure 4:
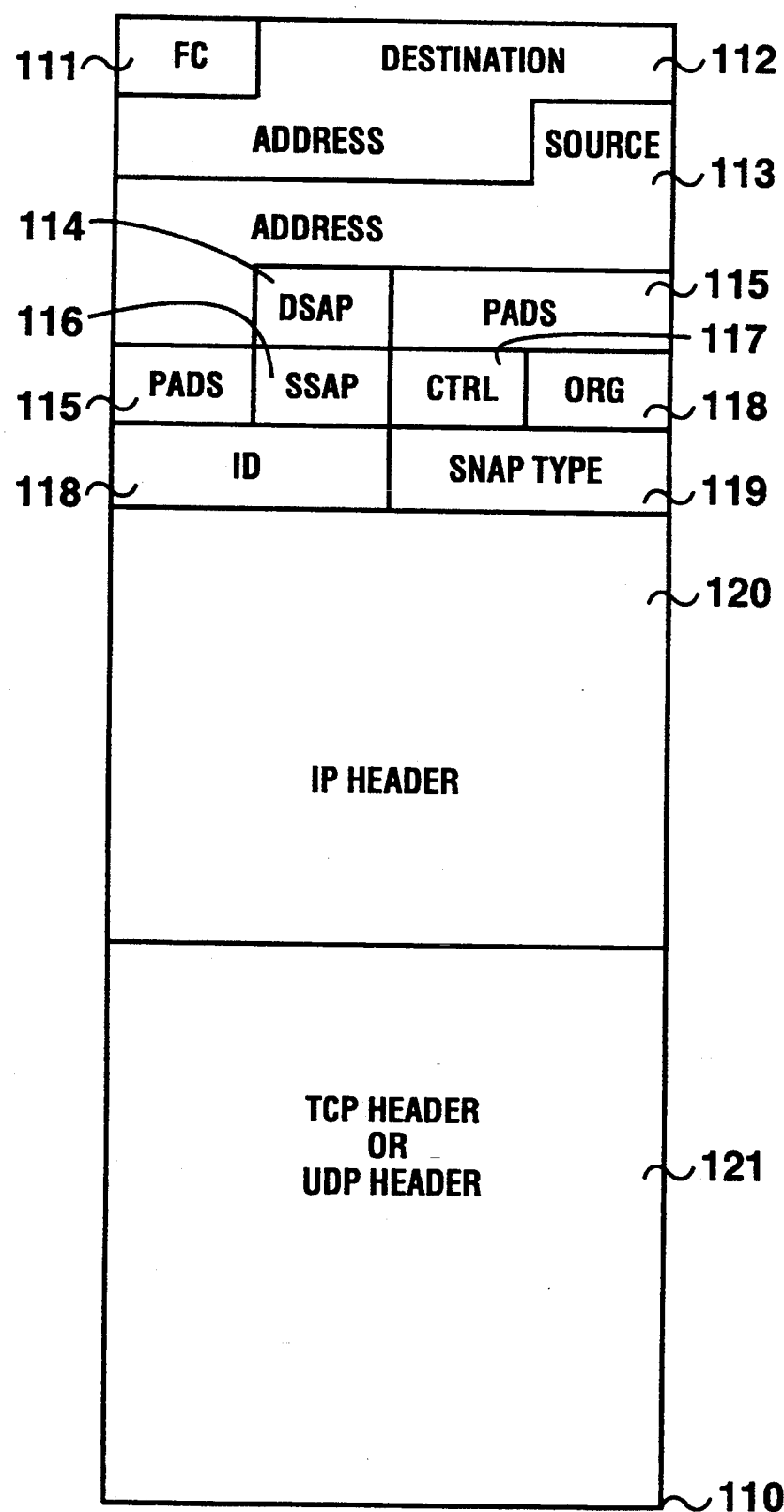

In order to align the headers, the preferred embodiment of the present invention inserts between 0 and 3 pad bytes between DSAP field 114 and SSAP field 116, based on the value found in the DSAP field. Subsequent headers will then be 4-byte aligned in the data stream. In media header 110, DSAP equals $AA_{hex}$ indicating media header 110 is a SNAP header. Therefore, three bytes of pad 115 are inserted after DSAP field 114, as shown in FIG. 4.

Figure 5:
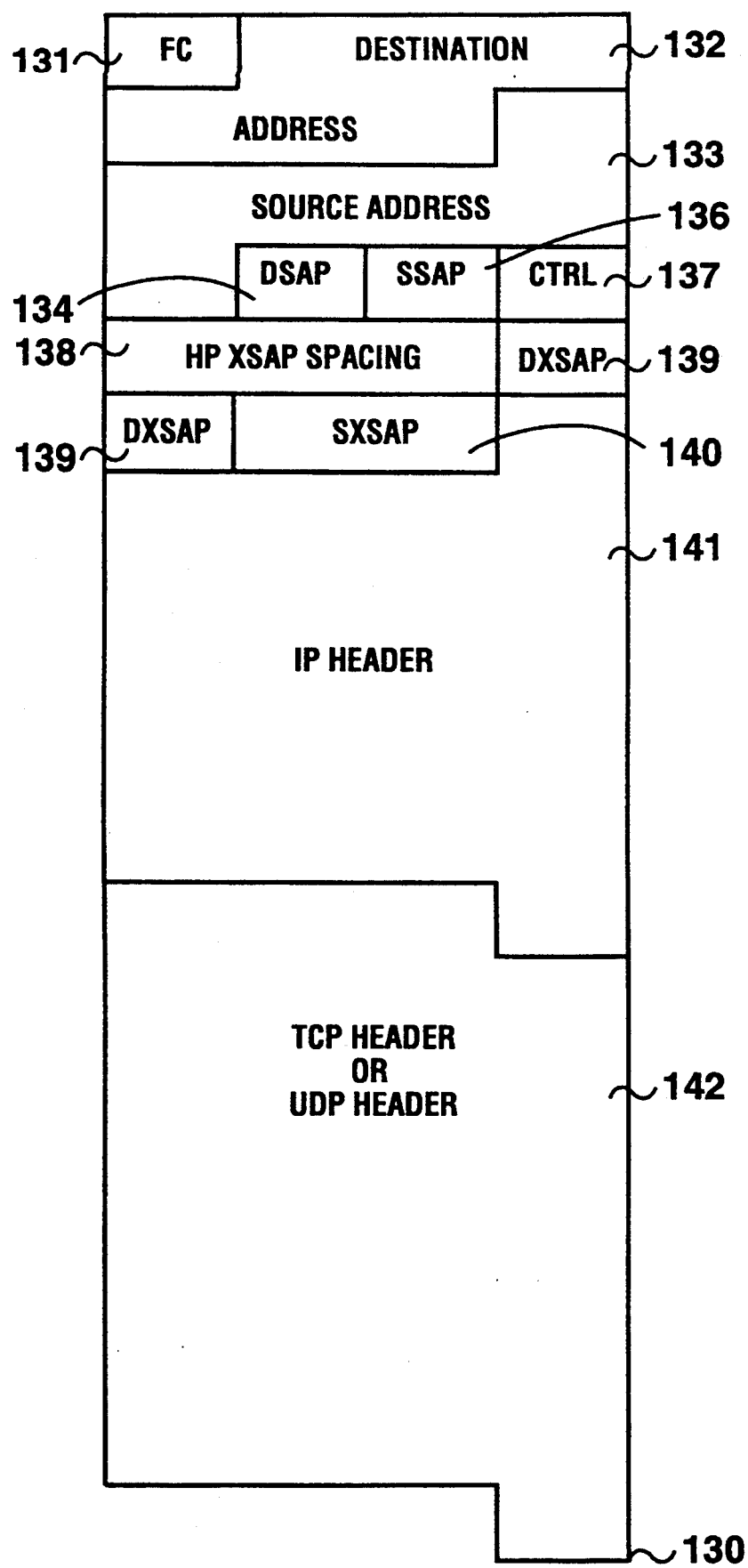

FIG. 5 shows an FDDI HP expansion header 130 before the insertion of a DSAP pad byte. Media header 130 includes a one byte frame control (FC) field 131. A six-byte destination address field 132 gives the media address of a station receiving the packet. A six-byte source address field 133 gives the media address of a station sending the packet.

A one byte Destination Service Access Point (DSAP) field 134 defines the type of service being used and therefore the format of the media header. DSAP equals FC$_{hex}$, indicating media header 130 is an HP expansion SAP and one pad byte will be inserted after DSAP field 134. A one byte SSAP field 136 contains the source service access point. LLC 802.2 Type 1 Control (CTRL) field 137, in the preferred embodiment, is always set to 3 which indicates unnumbered information. A three byte HP expansion service access point (XSAP) spacing field 138 is reserved. A two-byte destination expansion service access point (DXSAP) field 139 and a two-byte source expansion service access point (SXSAP) field 140 are utilized as part of a particular protocol.

After the above-described fields of the link header, an IP header 141 is followed by a TCP header or a UDP header.

Figure 6:
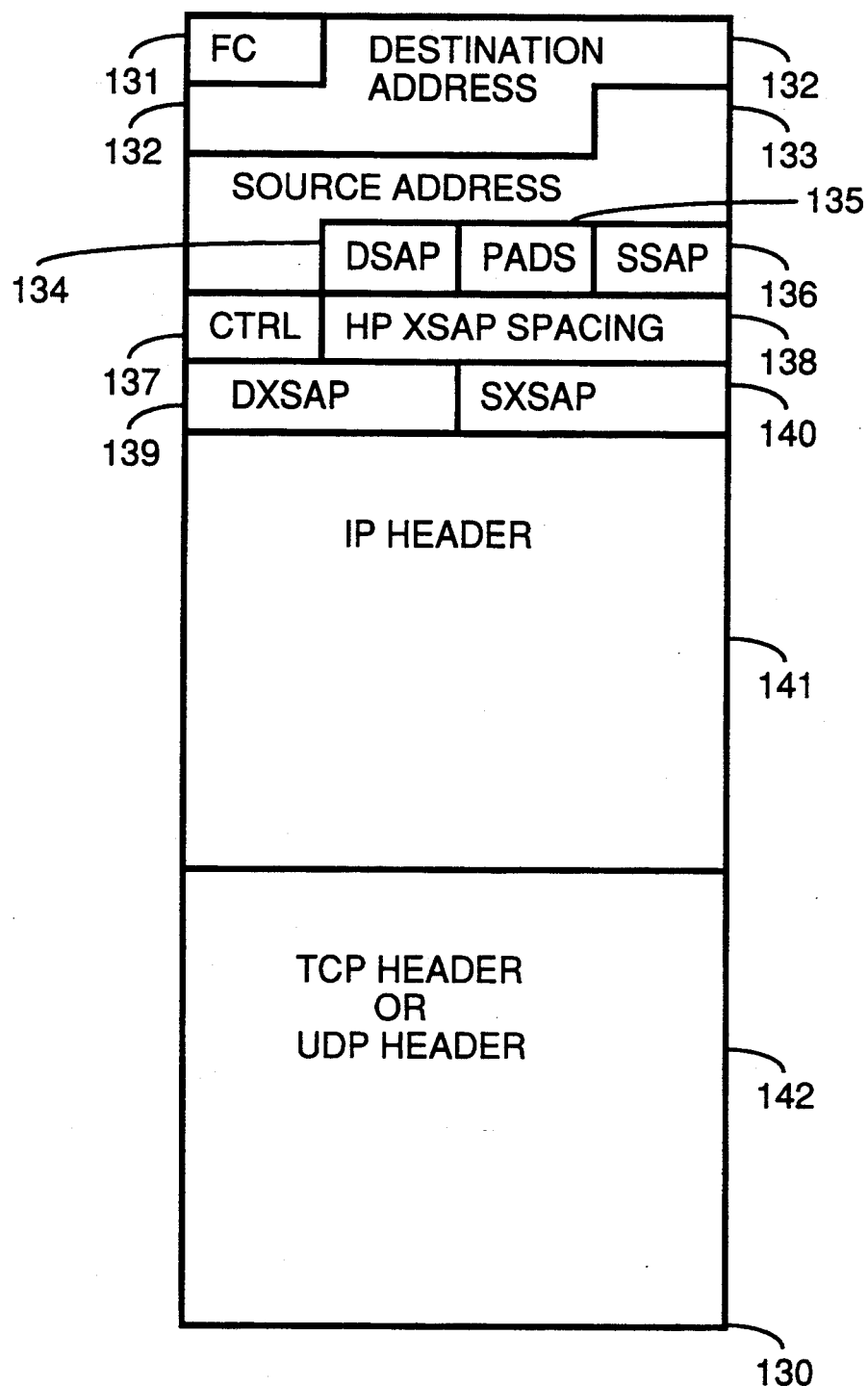

In order to align the headers, the preferred embodiment of the present invention inserts a pad byte between DSAP field 134 and SSAP field 136, based on the value found in the DSAP field. Subsequent headers will then be 4-byte aligned in the data stream. In media header 130, DSAP equals FC$_{hex}$ indicating media header 130 is an HP expansion SAP header. Therefore, a single pad byte 135 is inserted after DSAP field 134, as shown in FIG. 6.

Figure 7:
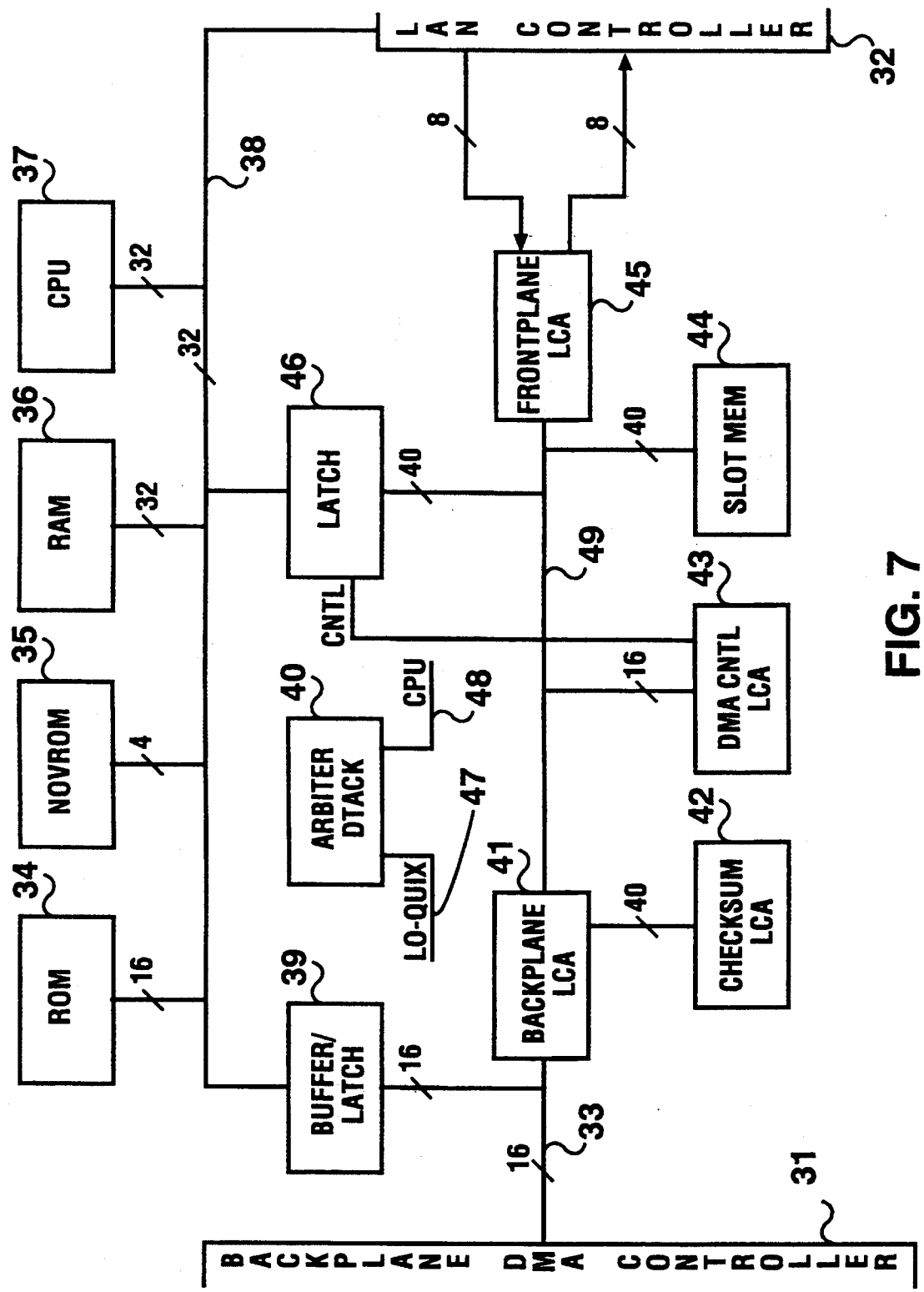
FIG. 7 shows a block diagram of a network adapter in accordance with a preferred embodiment of the present invention.

FIG. 7 shows a block diagram of a portion of logic used to implement network adapter 12 (shown in FIG. 1) in accordance with the preferred embodiment of the present invention. Network adapter 12 (shown in FIG. 1) is connected to a backplane DMA controller 31 of computer system 10 (shown in FIG. 1) through a backplane bus 33. Backplane DMA controller 31 performs DMA between memory 11 (shown in FIG. 1) and network adapter 12 (shown in FIG. 1).

Network adapter 12 is connected to network 30 through a front plane controller 32. For example, in the preferred embodiment, network 30 is an FDDI network and frontplane controller 32 is a LAN controller such as a LAN Controller DP83261, available from National Semiconductor Corporation, a California corporation having a place of business at 2900 Semiconductor Drive, Santa Clara, Calif. 95051.

A frontplane logic cell array (LCA) 45 serves to receive data from and send data to network 30 via frontplane controller 32. LAN controller 32 provides transmission and reception of data packets to and from network 30 (shown in FIG. 1).

For outbound transfers, frontplane LCA 45 unpacks the 32 bit words from a DMA bus 49 into 8 bit bytes for transmission by LAN controller 32. Frontplane LCA 45 also looks at the first byte of the output stream, which contains a count of how many FC pad bytes have been inserted by processor 15 (shown in FIG. 1), and then strips off the FC pad bytes and sends the rest of the packet to LAN controller 32. Frontplane LCA 45 loads an outbound first-in-first-out memory (FIFO) with data for transmission. Frontplane LCA 45 then controls the handshake with LAN controller 32 for transmission of the packet.

For inbound transfers, frontplane LCA 45 handshakes data into an inbound FIFO, while watching the status lines from LAN controller 32 for error conditions which would force a flush of the incoming packet. Frontplane LCA 45 takes the byte stream from LAN controller 32 and packs it into a 32 bit word stream for DMA bus 49. While frontplane LCA 45 packs the data stream, it also keeps track of the length of the packet being received and inserts this length as part of the packet status at the end of the packet. Frontplane LCA 45 also scans the input stream for the DSAP field to determine what type of padding will be required to force the remaining headers and data to be aligned. Upon finding the DSAP field, frontplane LCA 45 inserts 0-3 bytes of DSAP pad. When frontplane LCA 45 detects the end of the packet, by sensing the EDRCVD line, it will insert the status of the packet, as sensed from LAN controller 32, and the length of the packet. It will insert 0-3 bytes of pad to insure that the status and length are contained in a single 32 bit word. The length field will not include the number of bytes padded to align the status and length word, the SLLW, or the checksum result added by checksum LCA 42.

A backplane logic cell array (LCA) 41 serves to receive data from and send data to memory bus 13 (shown in FIG. 1) through backplane DMA controller 31.

A DMA bus 49 is separated from a processor bus 38 by a latch 46. A central processing unit (CPU) 37, a random access memory (RAM) 36, a nonvolatile RAM (NOVRAM) 35 and a read only memory (ROM) 34 are connected to processor bus 38. For example processor bus 38 is 32 bits wide. CPU 37 is a 68020 processor with a processor clock speed of 25 megahertz (MHz) available from Motorola Communications and Electronics Inc., having a business address at 801 Ames Avenue, Milpitas, Calif. CPU 37 is used to provide selftest functionality, chipset control of the frontplane (e.g. for initialization), connection management of the FDDI link, and other various functions. The code for the CPU 37 is contained in ROM 34. At startup, the CPU 37 will copy the code to RAM 36 and then execute the code from there. This will allow CPU 37 to execute with zero wait state instruction cycles.

A checksum logic cell array (LCA) 42, a DMA control logic cell array (LCA) 43 and a slot memory 44 are connected to DMA bus 49.

DMA bus 49, together with checksum LCA 42, DMA control LCA 43, backplane LCA 41 and slot memory 44 function as a data pipe to move data between LAN controller 32 and backplane DMA controller 31 with high throughput and low latency. The data pipe also provides the checksum hardware assist and manipulates the data to correct for improper alignment of headers, data, and buffers. A side feature is that the data pipe provides restricted access to the data stream by CPU 37 and does so with little effect on transfer performance.

Slot memory 44 is a block of fast static RAM that is designed to provide a bandwidth of 50 Mbytes/sec. This bandwidth is shared between LAN controller 32, backplane DMA controller 31, and CPU 37 by time division multiplexing. Access to slot memory 44 is controlled entirely by DMA controller LCA 43. Slot memory 44 is logically divided into 8K byte (enough for a maximum sized FDDI packet) slots into which packets are deposited. The slot concept provides a simple method of memory management.

The main function of DMA controller LCA 43 is to manage slot memory 44. DMA controller LCA 43 accepts requests for data transfers with slot memory 44 and then generates the addresses and data strobes necessary to move data to the proper client. No other device has direct access to slot memory 44. This method of memory management guarantees all accesses are short and no device will hold up another.

DMA controller LCA 43 provides two DMA channels, one for transfers with backplane DMA controller 31 and one for transfers with LAN controller 32. DMA controller LCA 43 also acts as a proxy for access by CPU 37 to slot memory 44. DMA controller LCA 43 has a CPU address register, that CPU 37 can load, which is used when CPU 37 requests access to slot memory 44. When CPU 37 requests data, DMA controller LCA 43 fetches data from the location pointed to by the CPU address register and latches it into latch 46 for later access by CPU 37. DMA controller LCA 43 also has another address register that is used to allow checksum LCA 42 to insert a checksum into an outbound packet.

Checksum LCA 42 snoops data bus 49 during data transfers and calculates a checksum as data is being moved to/from backplane DMA controller 31 from/to slot memory 44. In order to perform the checksum operation, the various parameters of the checksum must first be programmed into the checksum LCA 42. This is accomplished by inserting the configuration into the data stream.

Checksum LCA 42 is configured with a Checksum Type (None, TCP, UDP), a Checksum Start Offset, a Checksum Stop Offset and a Checksum Insert Offset (used only for outbound data packets). All the checksum offset parameters are BYTE offsets of the packet.

In the preferred embodiment of the present invention, checksum LCA 42 handles only ARPA services. Checksum LCA 42 will correctly handle a start and stop offset that is any arbitrary byte offset. This can be done because of the simple nature of the ARPA checksums, but for other checksums (i.e. OSI) this may not be sufficient.

The Checksum Stop Offset value must be the exact offset where checksumming must stop. If the checksum is to run to the end of the packet, it still must have the exact offset. Checksum LCA 42 will stop checksumming if the end of packet (EOP) bit is reached, but checksum LCA 42, shown in FIG. 7, will not know if all the bytes of the word are valid and it will assume that they are. Therefore, some garbage bytes may be included in the checksum if the stop offset is not exact.

Figure 15:
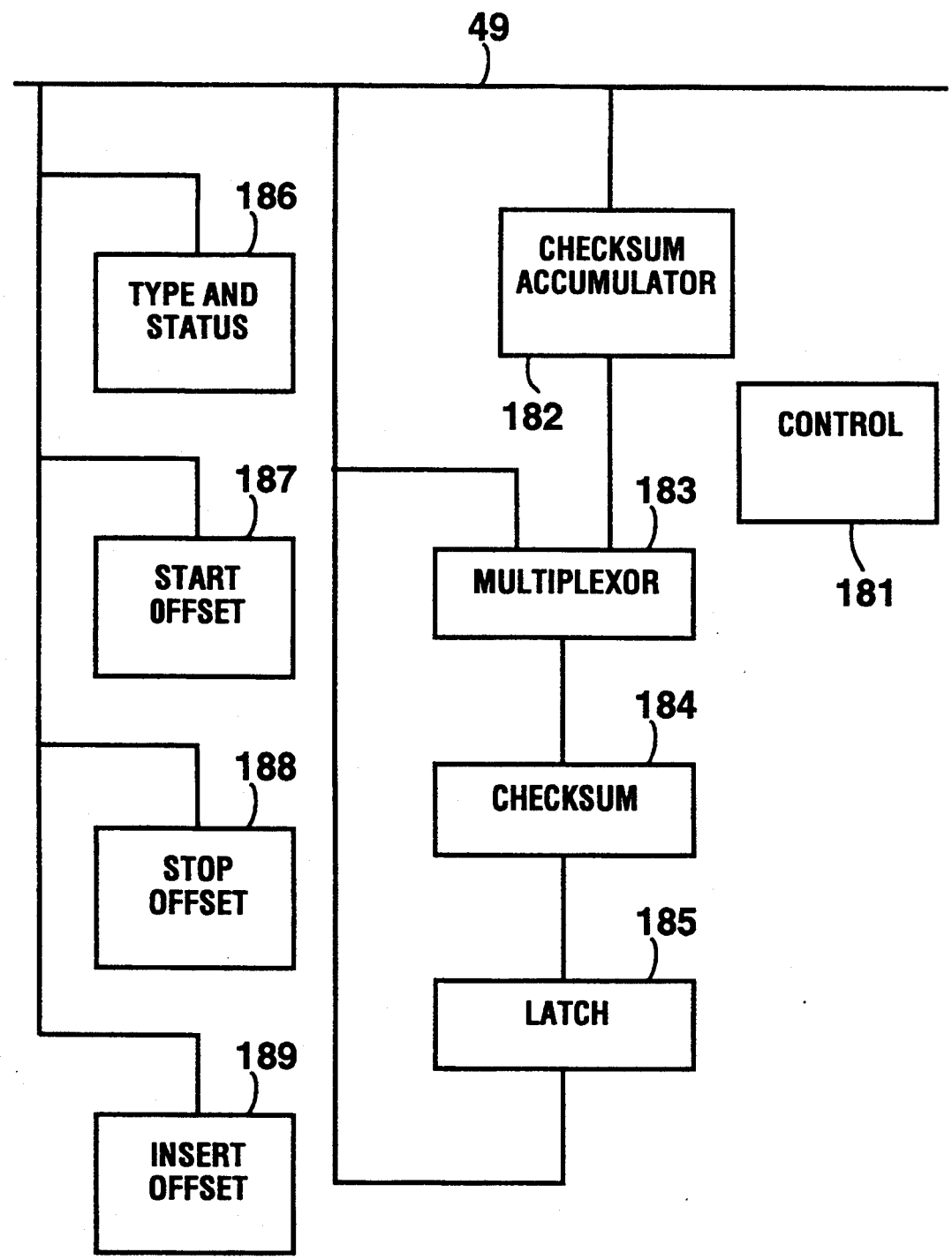
FIG. 15 shows a block diagram of a checksum logic cell array in accordance with the preferred embodiment of the present invention.

FIG. 15 shows a block diagram of checksum LCA 42. A type and status register 186 stores the checksum type. A start offset register 187 stores the start offset. A stop offset register 188 stores the stop offset. An insert offset register 189 stores the insert offset. A checksum accumulator 182 calculates the checksum of the data stream on DMA bus 49. A checksum is stored in a checksum register 184. A multiplexor 183 selects the results of checksum accumulator 182 or a value on DMA bus 49 to be placed in checksum register 184. A latch 185 is used to latch checksum 184 onto DMA bus 49. A control 181 controls operation of checksum LCA 42. In the block diagram shown in FIG. 15 shows only a single checksum accumulator, additional checksum accumulators may be added in order to accommodate different checksumming algorithms. These may be multiplexed to checksum register 184.

Backplane LCA 41 is used to handshake data with backplane DMA controller 31, pack and unpack data, and provide proper alignment of the data transferred through backplane DMA controller 31.

The following describes an outbound transfer with checksum insertion. In the preferred embodiment, network adapter 12, shown in FIG. 1, is always in a read pending state. This allows an inbound packet to get to processor 15 quickly. Because of this, processor 15 must first notify network adapter 12 that an outbound transfer is coming so that network adapter 12 can get set up to accept it. Also, since the outbound packet is to have a checksum inserted into the data stream, the packet must not be transmitted until the checksum has been inserted. This forces the outbound packet to be staged in slot memory 44 (shown in FIG. 7) until the checksum process is complete.

The following describes what must be done in order to insert a checksum and send an outbound packet. The outbound packet must be built in memory 11. Processor 15 must prepend an appropriate checksum control header to the packet.

Figure 8:
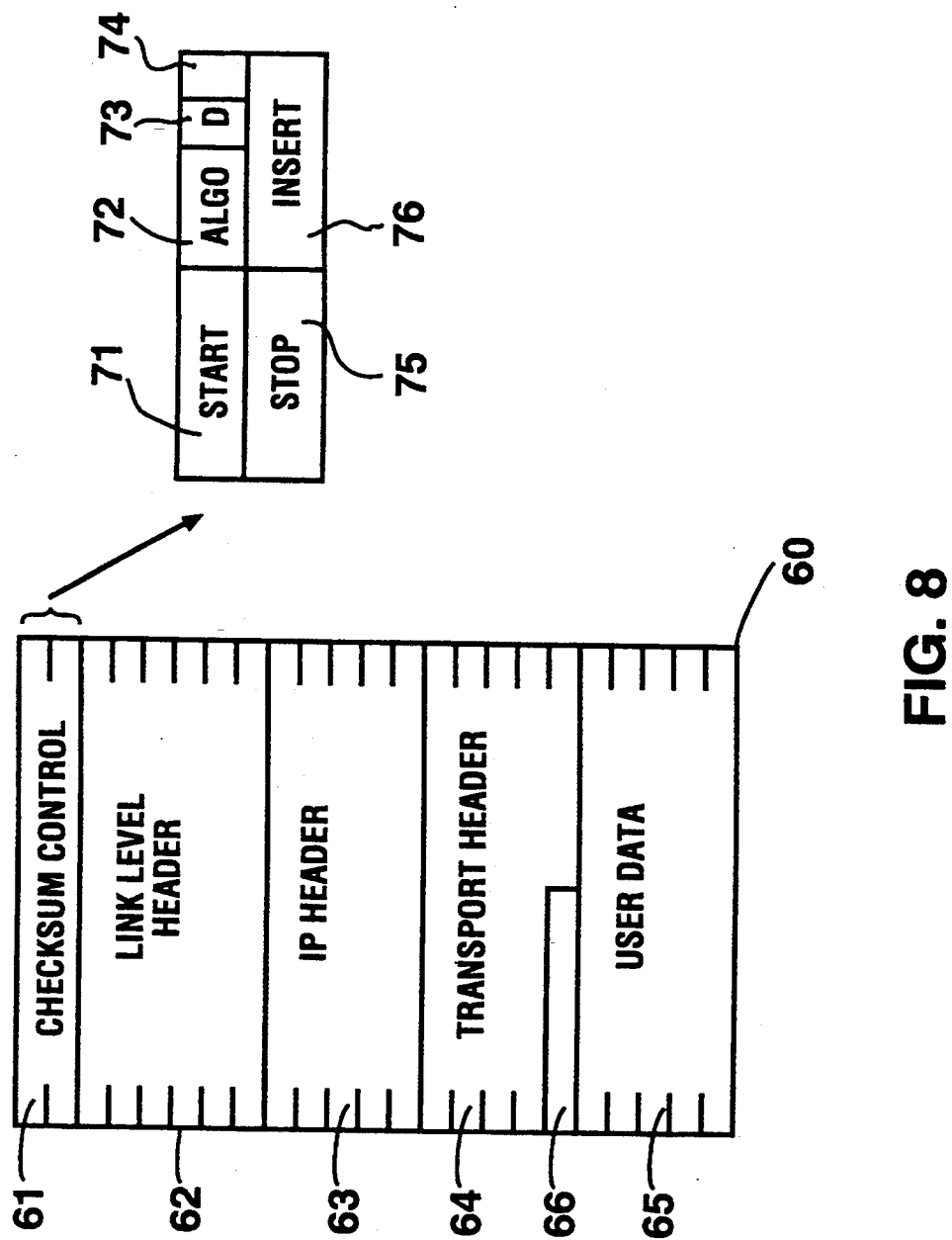
FIG. 8 shows a header of a network packet sent to a network adapter in accordance with a preferred embodiment of the present invention.

For example, FIG. 8 shows an outbound packet 60 built in memory 11 (shown in FIG. 1). Outbound packet 60 includes a checksum control header 61, a link level header 62, an IP header 63, a transport header 64 and user data 65. Checksum control header is shown to include a start offset field 71, a stop offset field 75, an algo field 72, a direction field 73, an insert field 74 and an insert offset field 76. Start offset field 71 indicates the byte at which checksumming is to start. Stop offset field 75 indicates the stop offset, that is, the number of bytes which are to be checksummed. Algo field 72 indicates the checksum algorithm used (TCP, UDP, etc.). Direction field 73 indicates the direction of data flow (inbound or outbound). Insert field 74 indicates whether the outbound packet is to have a checksum inserted. Insert offset field 76 indicates the location where a checksum is to be inserted.

Figure 9:
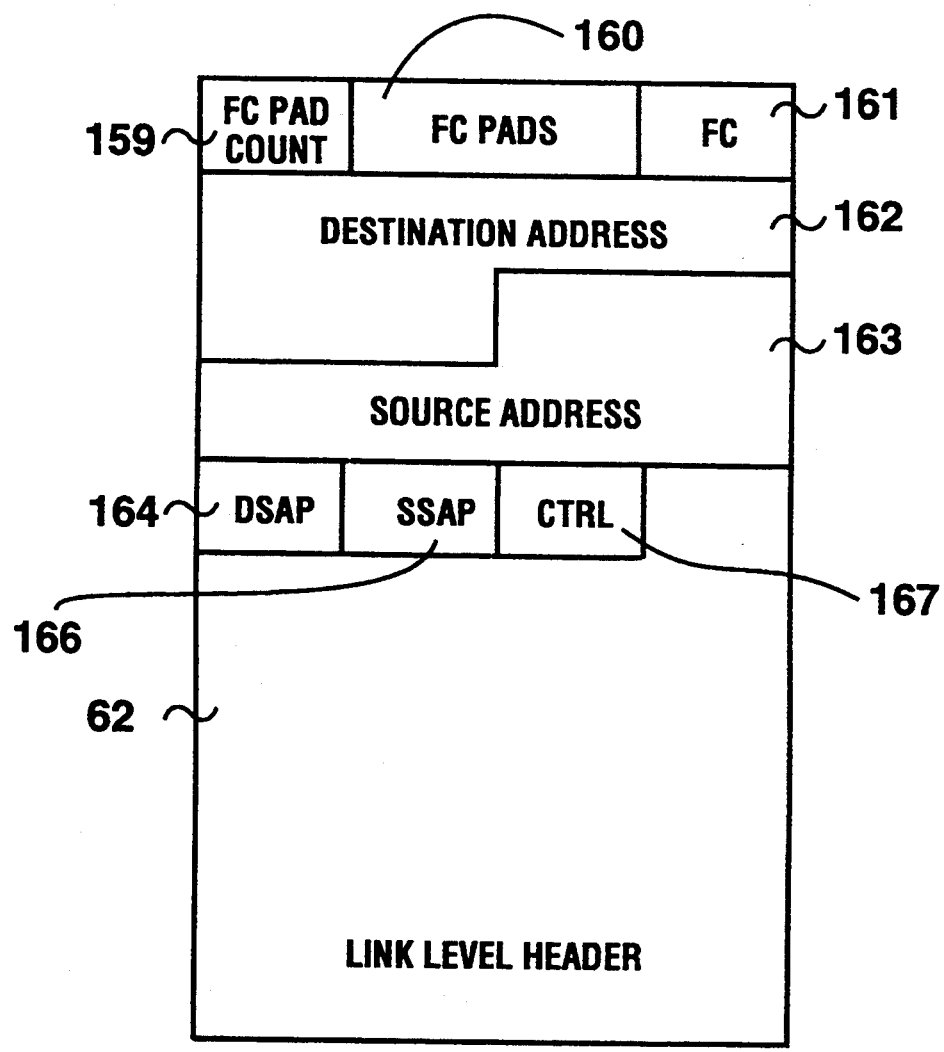
FIG. 9 shows pad added to a packet constructed in memory in accordance with a preferred embodiment of the present invention.

FIG. 9 shows how FC pad bytes 160 may be added in memory 11 to align the headers along multi-byte boundaries, for example, along 16 byte boundaries. In FIG. 9, Link level header 62 includes a one byte frame control (FC) field 161, six-byte destination address field 162, a six-byte source address field 163, a one byte Destination Service Access Point (DSAP) field 164, a one byte SSAP field 166, a Control (CTRL) field 167 and other fields (not shown). In order to allow alignment of the headers for DMA, FC pad bytes are added before FC field 161. An FC pad count field 159 indicates the number of FC pad bytes added.

The use of FC pads allows the networking protocol software operating on processor 15 to build its headers in main memory 11, without forcing the link header to fall on a particular multi-byte boundary. Generally, headers are built from back to front. The first byte of the header, therefore, is not necessarily aligned on any particular byte boundary. In the prior art, when a header was not properly aligned for DMA out of main memory 11, it would be necessary to copy the header before DMA to network adapter 12. In the preferred embodiment of the present invention, the first bytes of a DMA transfer are the FC count which signals the number of FC pad bytes which precede the header in order to allow the DMA to start at an aligned (i.e. cache line boundary) location. Additional FC pad bytes are added so that DMA transfer begins on a sixteen byte boundary.

Once the outbound packet is built in memory 11, backplane DMA controller 31 starts to move data from memory 11 to network adapter 12. DMA controller LCA 43 moves the data from backplane LCA 41 to slot memory 44, except for the checksum control 61, which contains configuration data for checksum LCA 42 and DMA controller LCA 43.

Figure 10:
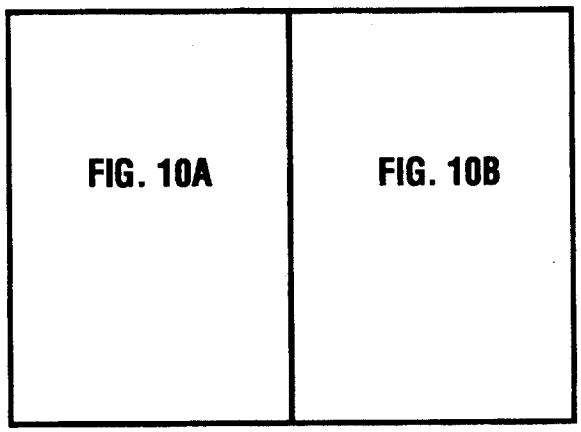
FIG. 10 is a simplified diagram showing a network adapter receiving a network packet from a host in accordance with a preferred embodiment of the present invention.
Figure 10A:
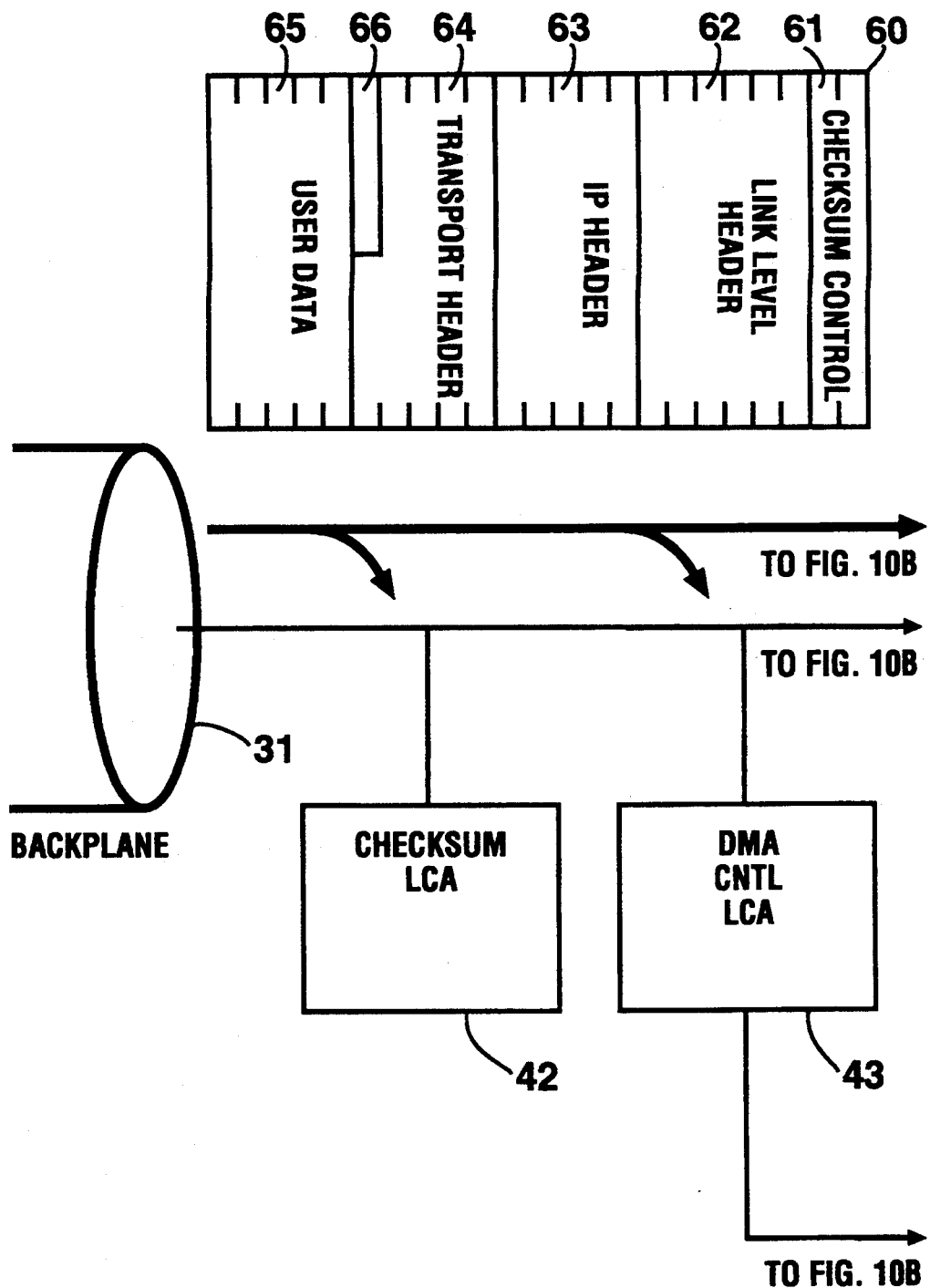
Figure 10B:
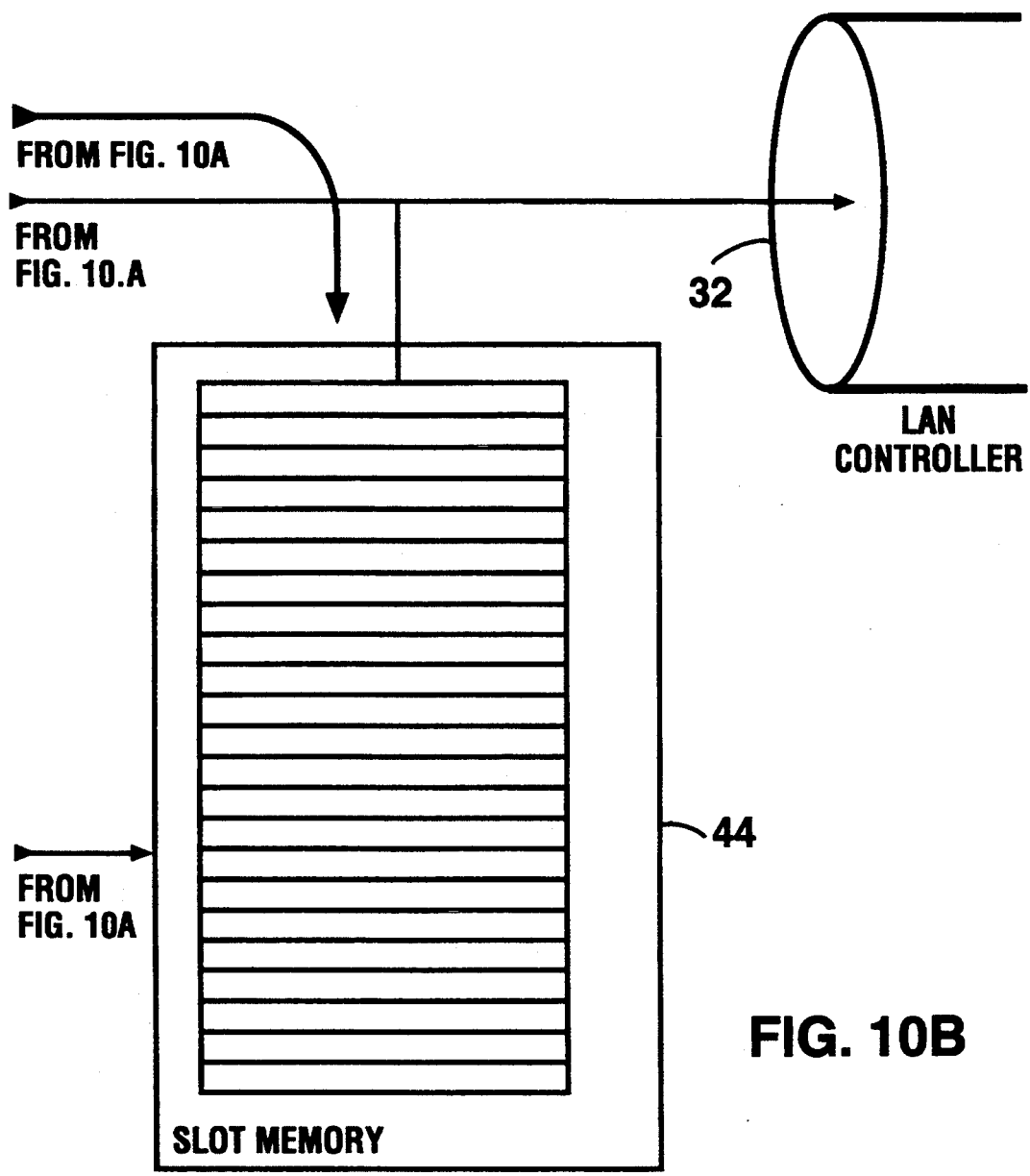

DMA controller LCA 43 must check insert field 74 of checksum control header 60 to determine if the packet is to have a checksum inserted or not. In the case where a checksum is to be inserted, outbound packet 60 packet must be stored in slot memory 44 until the checksum is inserted. This is illustrated by FIG. 10.

While DMA controller LCA 43 moves the data from backplane LCA 41 to slot memory 44, checksum LCA 42 snoops the data on DMA bus 49, checksumming the data as it goes by. In the preferred embodiment, a sixteen bit add with carry is used. The checksumming starts at the byte designated by start offset field 71 and continues until either the stop offset is reached or the end of packet (EOP) bit is sensed. Checksum LCA 42 mask off bytes that are not part of the checksum. This allows checksumming to start and stop on arbitrary byte boundaries. This works fine for ARPA services, but some modification to the algorithm will be needed for other types of checksum.

Figure 11:
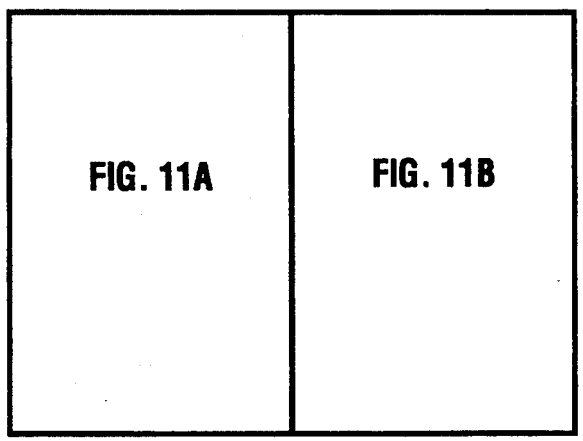
FIG. 11 is a simplified diagram showing a checksum being added to a network packet in accordance with a preferred embodiment of the present invention.
Figure 11A:
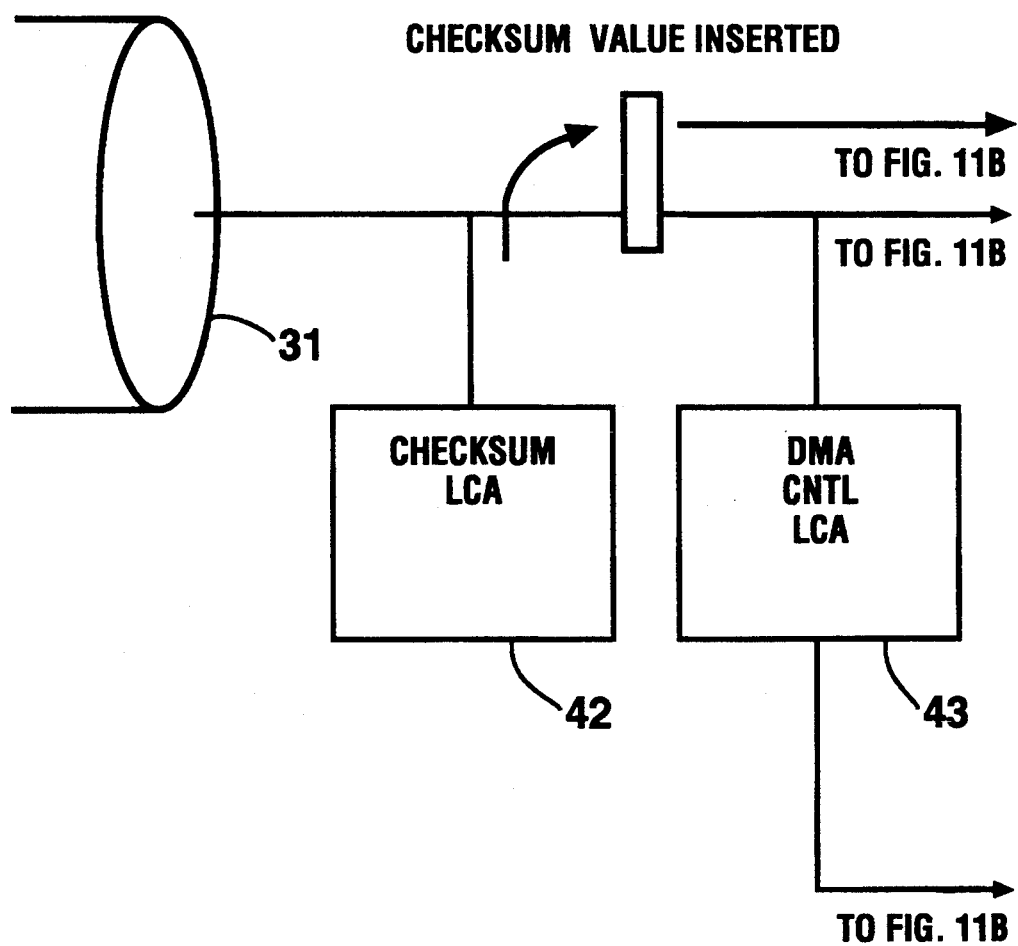
Figure 11B:
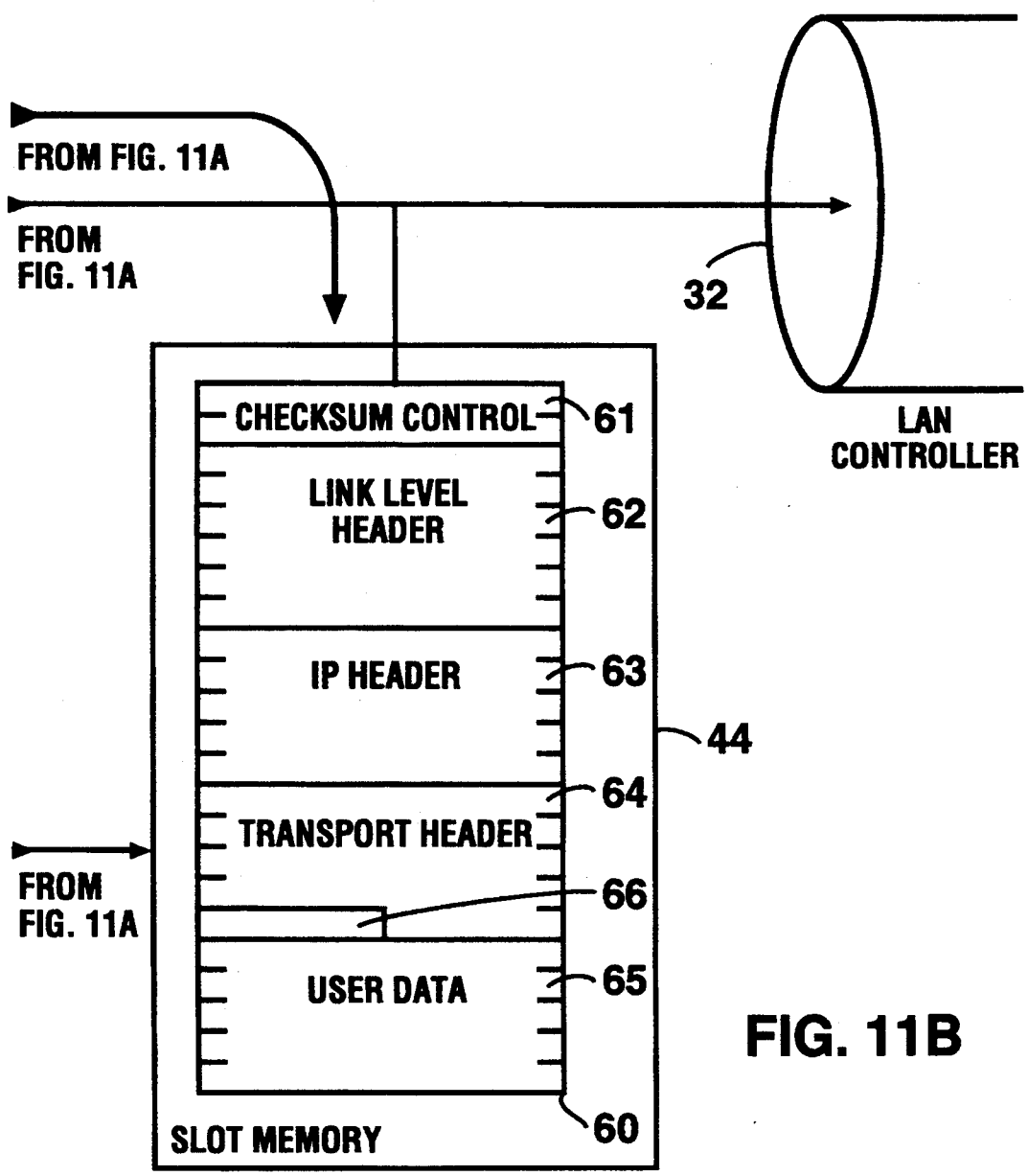

When the last word of data is latched by backplane LCA 41, as indicated by backplane DMA controller 31, backplane LCA 41 so signals to checksum LCA 42. Upon receipt of the signal, checksum LCA 42 asserts a checksum value 77 on data bus 49 and signals DMA controller LCA 43 to write checksum value 77 into slot memory 44 at the offset given in insert offset field 76. This is illustrated by FIG. 11. Also upon detecting the end of the packet, backplane DMA controller 31 interrupts processor 15. If processor 15 is done with outbound transfers, processor 15 posts a read to network adapter 12. If processor 15 wishes to do another outbound transfer, processor 15 proceeds with the next outbound transfer.

Once checksum value 77 is written into slot memory 44, DMA controller LCA 43 starts to move data from slot memory 44 to LAN controller 32 for transmission to network 30. Frontplane control LCA 45 unpacks the 32-bit data stream into an 8 bit data stream. This data stream contains a Frame Control byte and the preceding FC pad bytes. Frontplane control LCA 45 will strip off the FC pad bytes and send the remainder of the data stream to LAN controller 32.

An outbound transfer may also be sent without a checksum insertion. Since this outbound packet won't have to insert a checksum, the packet can be immediately streamed to LAN controller 32 for transmission. The lack of an insertion of a checksum does not mean that a checksum cannot be calculated for the packet. For example, if an IP fragment train is being processed, the first N packets will have a running checksum calculated and only the N+1 packet will have the total checksum inserted into it. The first N packets can be immediately streamed to LAN controller 32.

The following process is done to receive an inbound packet. The inbound packet starts arriving in LAN controller 32. LAN controller 32 signals frontplane LCA 45 that data is arriving. Frontplane control LCA 45 clocks the data into a buffer within frontplane control LCA 45. When the number of bytes received exceeds a fixed threshold, a signal is given to DMA controller LCA 43 to start moving data into slot memory 44.

Figure 12:
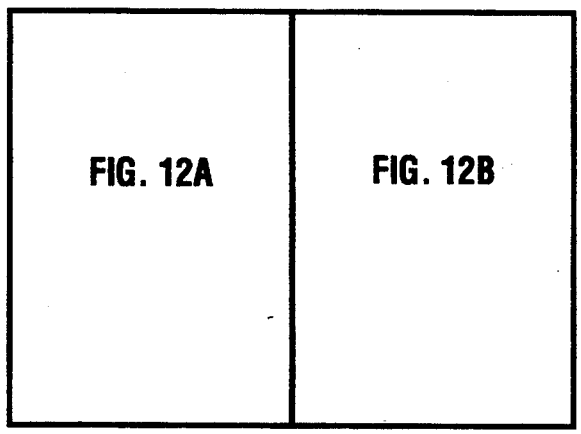
FIG. 12 is a simplified diagram showing a network packet being received by a network adapter from a network in accordance with a preferred embodiment of the present.
Figure 12A:
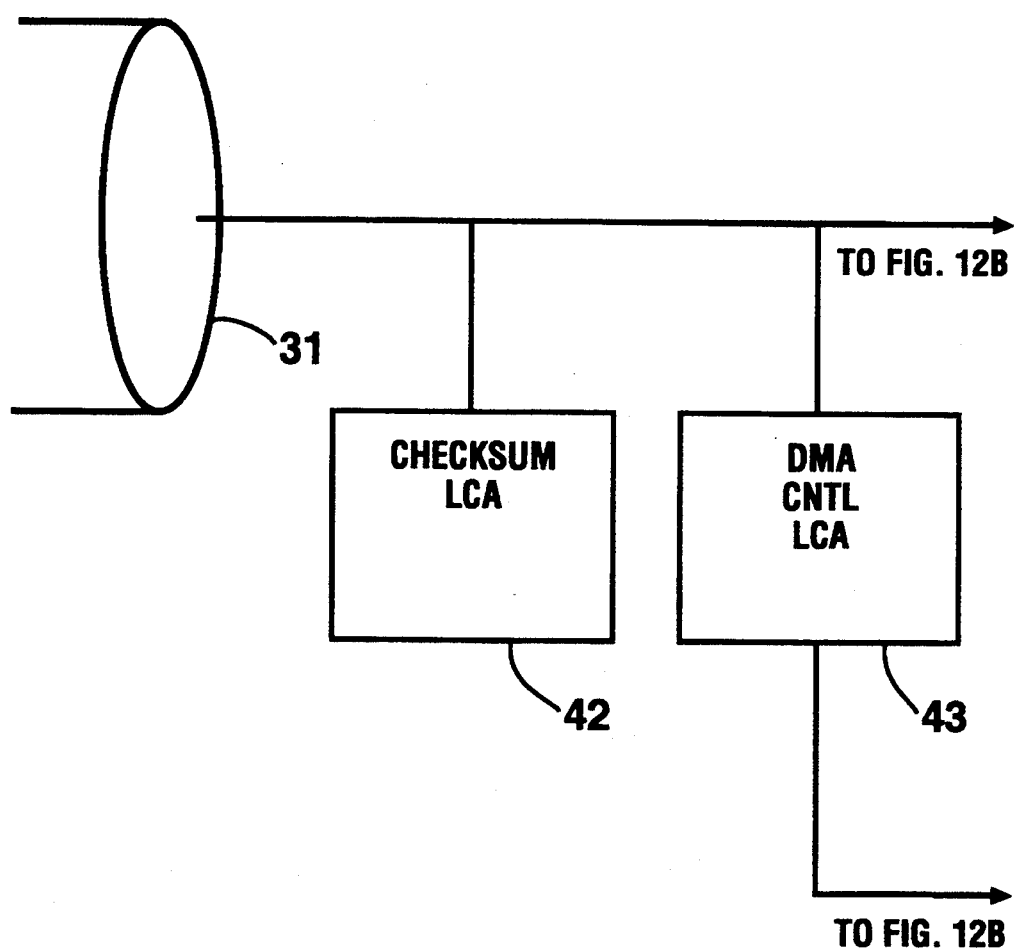
Figure 12B:
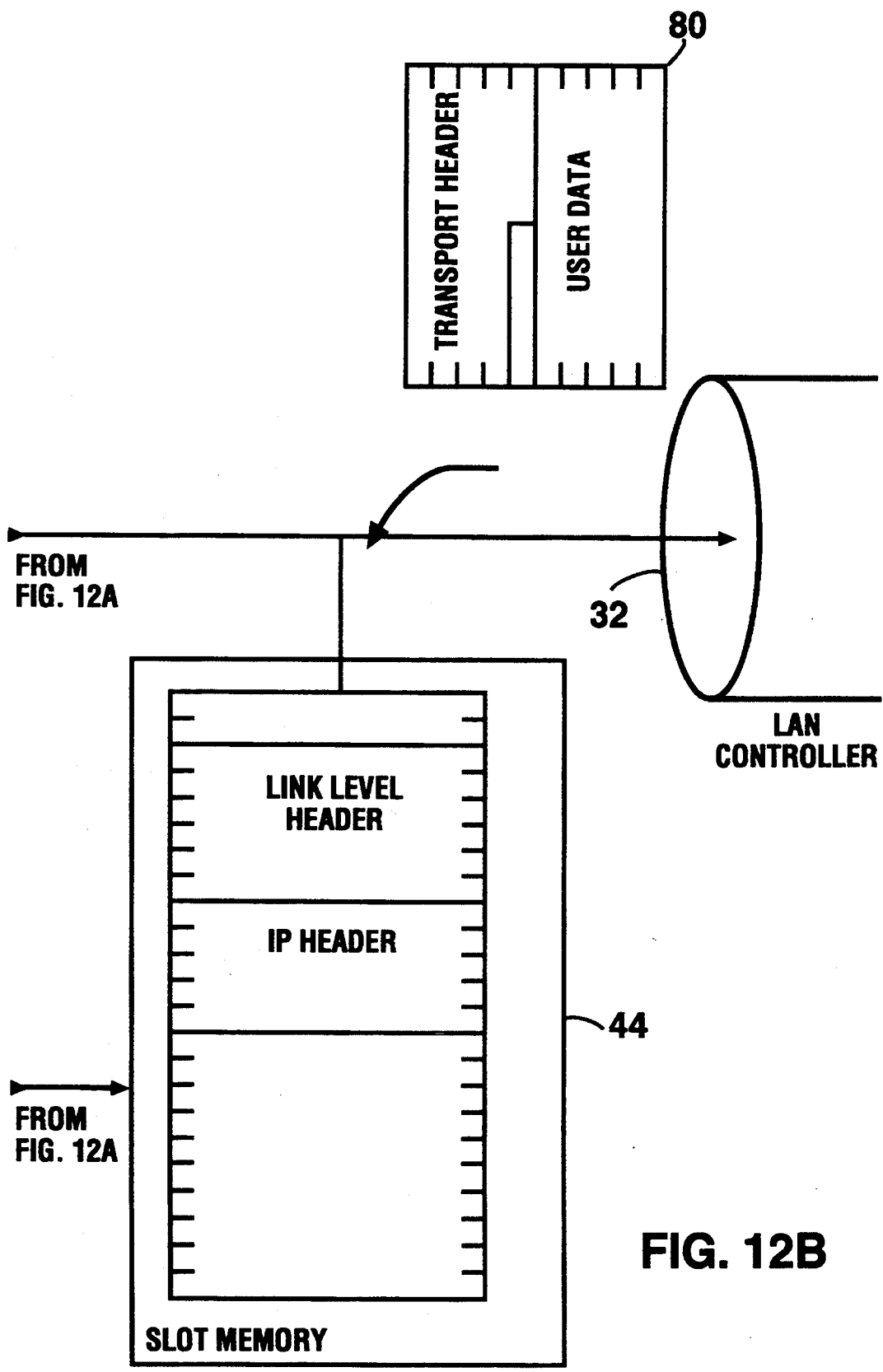

FIG. 12 illustrates an inbound packet 80 being moved into slot memory 44. As data is moving into slot memory 44, frontplane LCA 45 is looking for the DSAP field within the inbound packet. Once found, the frontplane LCA 45 inserts pad bytes, based on the value of the DSAP, to align the data and header portion of the packet.

After the pad bytes are inserted, DMA controller LCA 43 moves the remainder of the data to slot memory 44. When the end of the packet is reached, frontplane LCA 45 will append the status bits from LAN controller 32 and the length of the packet to the end of the data stream. Frontplane LCA 45 will also force the status/length word to be long word aligned by appending leading pads. It will assert the EOP bit on the last byte of the status/length word.

DMA controller LCA 43 moves the data into a slot in slot memory 44. When the number of bytes moved exceeds a fixed threshold, for example 32 bytes, an interrupt is given to CPU 37 to signal that it can start reading the header from slot memory 44. CPU 37 will analyze the header to determine the checksum type, start and stop offsets. The CPU will also determine where to separate the header from data.

DMA controller LCA 43 has a counter which keeps track of the number of pending packets waiting to be analyzed by CPU 37.

CPU 37 analyses the header and writes the header/data split and the checksum information to slot memory 44 using the CPU address register within DMA controller LCA 43. If the checksum type is NONE, the start and stop fields are ignored and do not need to be written.

The first 3 words of the transfer are not given to backplane LCA 41, but are latched by checksum LCA 42 to load the checksum configuration for the current inbound packet.

The next word is loaded by backplane LCA 41 into an internal split offset counter within backplane LCA 41, as well as passing it on as data to processor 15. This internal split offset count is based on the header buffer length and is used to determine when the header has been sent to processor 15 and when to start padding data bytes to fill out the first buffer on the data chain.

Backplane LCA 41 unpacks the 32 bit data stream from midplane bus 49 into a 16 bit data stream for transfer to backplane DMA controller 31. It will continue to do this until it senses the End-Of-Packet (EOP) bit, which ends the DMA transfer.

The DSAP pads help insure that the header/data split is on a four-byte boundary, so it will not be necessary to handle odd byte alignments. If CPU 37 determines that the header/data split is not on an even byte boundary, the inbound packet must be transferred to memory anyway, and the alignment must be corrected by processor 15. If backplane LCA 41 detects an odd split offset, it will set an error indication in a status register accessible by processor 15.

As data is sent to memory 11, backplane LCA 41 decrements the split offset count and the header buffer length count. The header buffer length count is initialized to the number of bytes in a memory buffer. When the split offset count reaches zero, backplane LCA 41 will start sending pad data and decrementing a header buffer length count until it reaches zero. This serves to fill up the first buffer which is designed to contain only the header. At this time, backplane LCA 41 resumes sending data from slot memory 44. This will be the data payload which will end up being page aligned. In an alternate preferred embodiment, when the split offset count reaches zero, backplane LCA 41 will start sending data to a next memory buffer without sending pad data. This alternate embodiment allows more efficient transfers, and is preferred when the backplane DMA controller is able to implement it.

Figure 13:
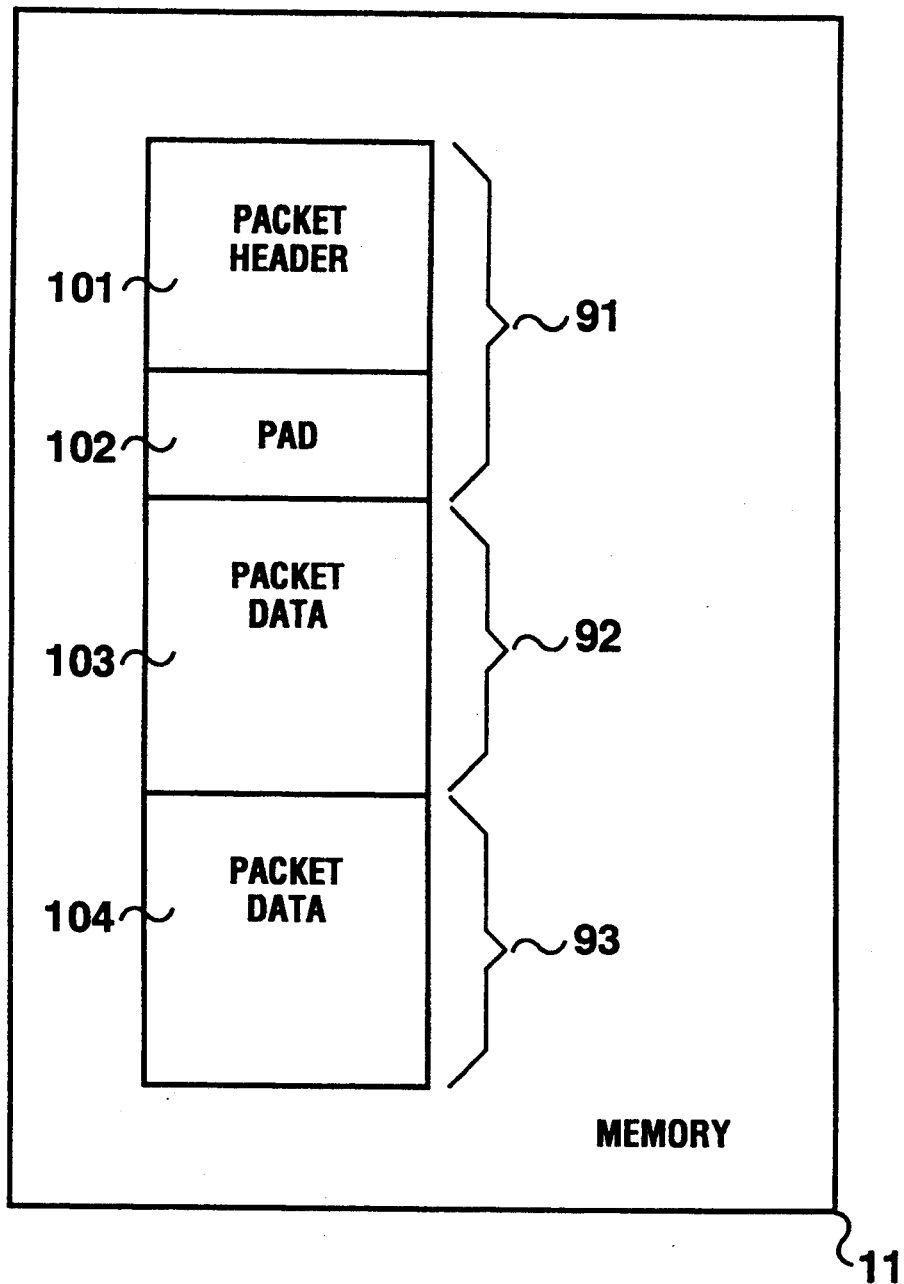
FIG. 13 shows a network packet stored in a main memory in accordance with a preferred embodiment of the present invention.

FIG. 13 illustrates the resultant alignment in memory 11. In memory 11, a header buffer 91, a data buffer 92 and a data buffer 93 are shown. Header buffers are a small portion of memory. Data buffers 92 and 93 each represent a single page of memory 11. For example, each page of memory includes 2048 bytes of data. In order to assure that data is page aligned, pad data 102 is added after a packet header 101 to fill up header buffer 91. This assures that packet data 103 is placed beginning in data buffer 92. Additional packet data 104 may be placed in a following data buffer 93, if necessary.

When the last word of the data is latched into backplane LCA 41, the EOP bit will be set. This word is the Status Length Long Word (SLLW). Backplane LCA 41 now looks to see if this last 32 bits of data will be on an 8 byte boundary in memory 11. If not, it will send pad bytes to force this alignment. This assists processor 15 in finding the status and checksum information quickly. The SLLW will then be sent.

Figure 14:
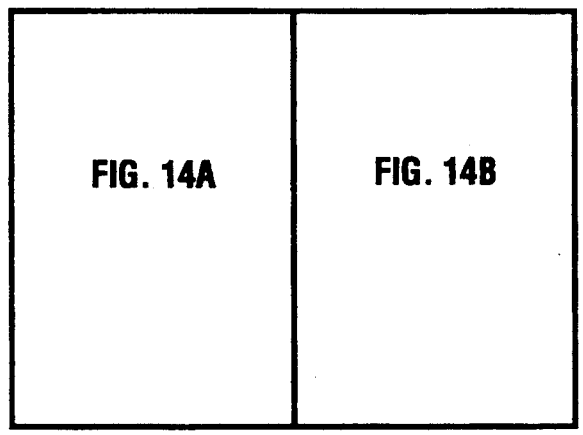
FIG. 14 is a simplified diagram showing a network packet being sent by a network adapter to a host system in accordance with a preferred embodiment of the present invention.
Figure 14A:
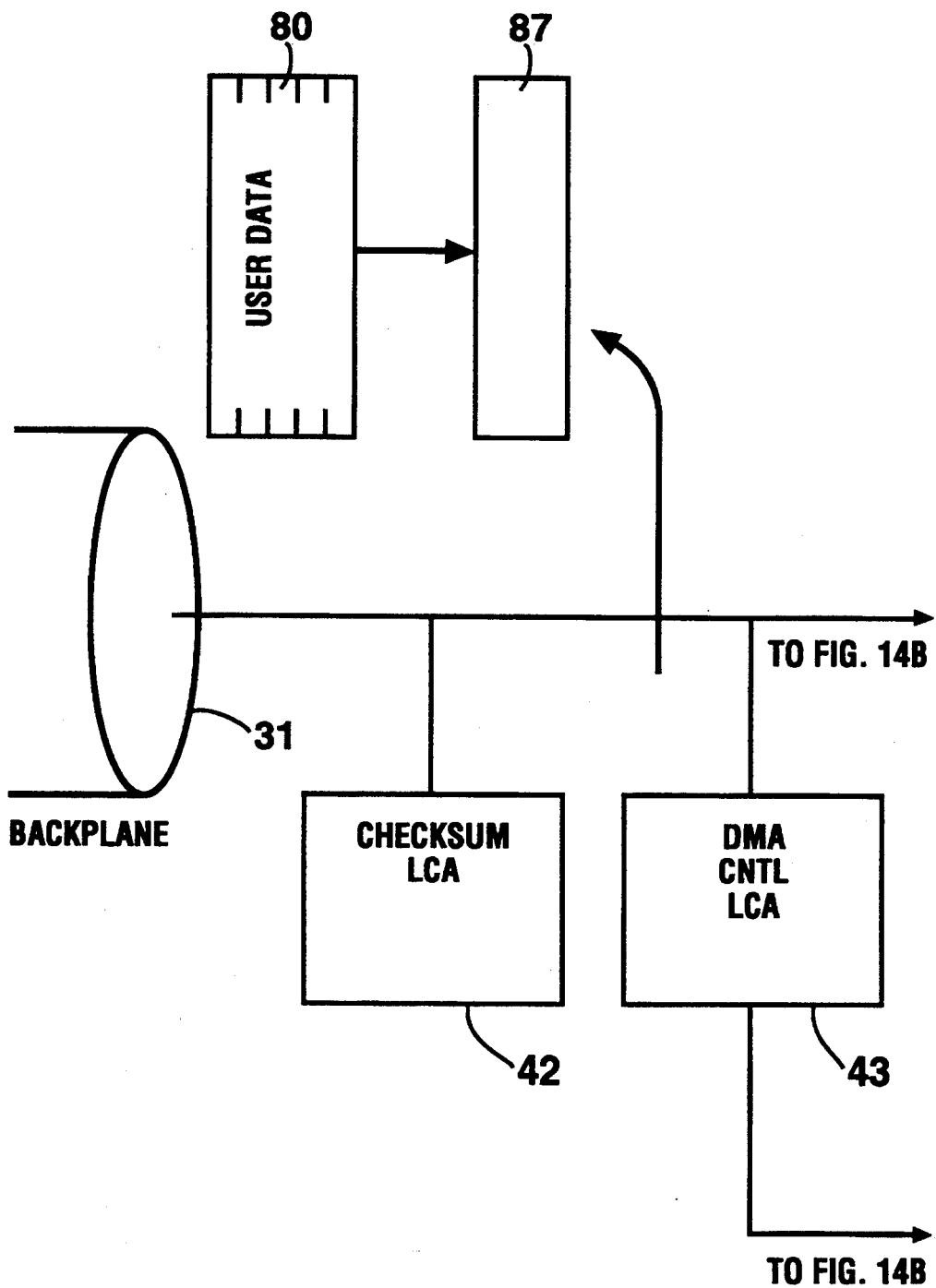
Figure 14B:
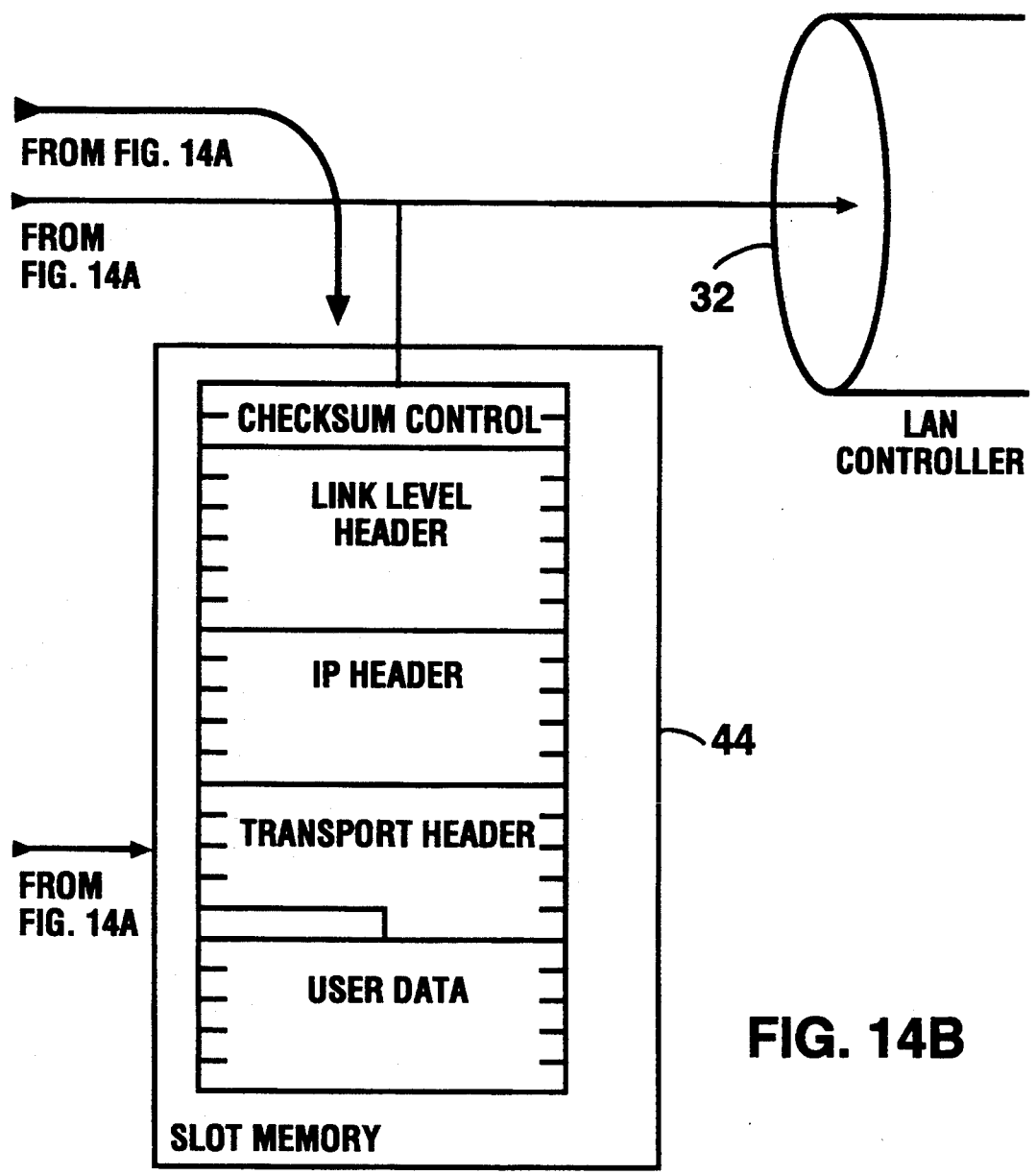

After backplane LCA 41 sends the SLLW, backplane LCA 41 will read in one more word from the pipeline data bus, which contains a checksum result 87. This is represented by FIG. 14. Checksum result 87 is transferred to backplane DMA controller 31 with a signal that the DMA transfer is complete. This terminates the DMA transfer and backplane DMA controller 31 will generate an interrupt to processor 15 signaling the DMA transfer completion. Processor 15, upon interrupt, reads a status register within backplane LCA 41, which indicates the length (in words) of the inbound transfer. The status register will also indicate if any errors occurred on network adapter 12 and whether buffers exist on network adapter 12 to do more inbound or outbound processing.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. In a computing system connected to a network, the computing system including a processor, a main memory and a network adapter coupled to the processor and the main memory, a method for implementing checksumming of a network packet sent over the network, the method comprising the steps of:
   (a) constructing, by the processor, the network packet within the main memory;
   (b) performing a transfer of the network packet from the main memory to a packet storage memory within the network adapter, including transferring a checksum header prepended to the network packet, the checksum header including control information for checksumming, the control information for checksumming including an insert indicator, which indicates whether checksumming is to be performed and including information which specifies on which portion of the network packet the checksum is to be calculated;
   (c) when the insert indicator indicates checksumming is to be performed, performing the following substeps:
      (c.1) calculating, by the network adapter, a checksum for the network packet during transfer of the network packet, and
      (c.2) inserting, by the network adapter, the checksum into the network packet, the network packet being stored within the packet storage memory; and,
   (d) after step (c), transferring, by the network adapter, the network packet to the network.

2. A method as in claim 1 wherein the control information additionally includes a location within network packet where, in step (c.2), the checksum is to be inserted.

3. A method as in claim 1 wherein substep (c.1) includes monitoring, by hardware within the network adapter, of the network packet as the network packet is transported over an internal bus within the network adapter to the packet storage memory.

4. In a computing system connected to a network, the computing system including a main memory coupled to a network adapter, a method for implementing checksumming of a network packet received from the network, the method comprising the steps of:
   (a) receiving, by the network adapter, the network packet from the network;
   (b) performing a transfer of the network packet from the network adapter to the main memory including generating, by the network adapter, checksum configuration information, the checksum configuration information including an insert indicator which indicates whether checksumming is to be performed and including information which specifies on which portion of the network packet the checksum is to be calculated; and,
   (c) when the insert indicator indicates checksumming is to be performed, performing the following substeps
      (c.1) calculating, by the network adapter, a checksum for the network packet during transfer of the network packet from the network adapter to the main memory, and
      (c.2) appending, by the network adapter, the checksum onto the network packet transferred to the main memory.

5. A method as in claim 4 wherein step (a) includes the substep of:
   (a.1) placing, by the network adapter, the network packet into a packet storage memory within the network adapter.

6. A method as in claim 5 wherein step (c.1) includes monitoring, by hardware within the network adapter, of a network adapter internal bus as the network packet is transferred from the network adapter, the network adapter internal bus being within the network adapter.

7. In a computing system connected to a network, the computing system including a processor and a main memory, a network adapter comprising:
   a DMA bus;
   a packet storage means, coupled to the DMA bus, for storing network packets;
   DMA means, coupled to the DMA bus, for performing a transfer of a network packet between the main memory and the packet storage means; and,
   checksum calculating means, coupled to the DMA bus, for calculating a checksum for the network packet during transfer of the network packet over the DMA bus, the checksum calculating means including:
      monitoring means for monitoring data transported on the DMA bus, insertion means for inserting the checksum calculated by the checksum calculating means into a network data packet stored in the packet storage means, and control information storage means for storing checksum control information, the checksum control information including an insert indicator, wherein when the insert indicator indicates checksumming is to be performed, the checksum configuration information additionally includes information which specifies which portion of the network packet the checksum calculating means is to use to calculate the checksum, and wherein when the insert indicator indicates checksumming is not to be performed, the checksum calculating means does not perform a checksum for the network packet.

8. A network adapter as in claim 7 wherein the checksum control information additionally includes a location, within an outbound network packet stored in the packet storage means, where the checksum is to be inserted.

9. A network adapter as in claim 7 wherein the control information storage stores checksum control information for an inbound network packet.

* * * * *